United States Patent

Onodera

[11] 4,041,355
[45] Aug. 9, 1977

[54] HIGH VOLTAGE GENERATING CIRCUIT

[75] Inventor: Toshio Onodera, Yokosuka, Japan

[73] Assignee: Sony Corporation, Tokyo, Japan

[21] Appl. No.: 623,107

[22] Filed: Oct. 16, 1975

[30] Foreign Application Priority Data

Oct. 21, 1974   Japan .......................... 49-127007[U]

[51] Int. Cl.$^2$ ............................................. H01J 29/70
[52] U.S. Cl. .................................. 315/411; 315/399; 315/405; 358/190
[58] Field of Search ............... 315/411, 408, 399, 400, 315/405; 358/190

[56] References Cited

U.S. PATENT DOCUMENTS

| 3,500,116 | 3/1970 | Rietveld et al. | 315/405 |
| 3,920,892 | 11/1975 | Dietz | 358/190 |

Primary Examiner—Maynard R. Wilbur
Assistant Examiner—T. M. Blum
Attorney, Agent, or Firm—Hill, Gross, Simpson, Van Santen, Steadman, Chiara & Simpson

[57] ABSTRACT

A high voltage generating circuit for a television receiver which includes a horizontal oscillator and a switching circuit operating at the horizontal sweep frequency of the television receiver and being coupled to a flyback transformer which has an input resonant frequency in the vicinity of but higher than the horizontal oscillator frequency. The output of the flyback transformer is coupled to a rectifier circuit which in turn is coupled to the high voltage anode of the television receiver. The flyback transformer also has an input resonant circuit which includes a capacitor which is serially connected to the primary winding of the flyback transformer. This series resonant circuit is resonant at a frequency in the vicinity but less than the frequency of the horizontal oscillator with the result that improved voltage regulation is obtained while avoiding excess high voltage which otherwise would be caused by a shift in the output frequency of the horizontal oscillator.

5 Claims, 6 Drawing Figures

HIGH VOLTAGE GENERATING CIRCUIT

BACKGROUND OF THE INVENTION

1. Description of the Prior Art:

Prior art high voltage generating circuits of television receivers have hitherto comprised so-called pulse rectifying systems in which the resonant frequency in a flyback transformer is selected to be higher than the horizontal sweep frequency of 15.75 KHz, that is, for example, about 50 KHz. This flyback transformer generates a high voltage narrow width pulse of horizontal period which is peak-value-rectified by a rectifier circuit consisting of a diode. Such prior art pulse rectifying systems have the drawback that when the high voltage load current increases, the high voltage is greatly lowered since the angle of current flow of the diode in the rectifier circuit is quite small and the regulation is inferior.

Further, there has been considered such a system that the high voltage pulse is converted into a sine-wave voltage by using a resonant circuit which is tuned to the vicinity of the horizontal frequency, and this sine-wave voltage is rectified by a rectifier circuit consisting of a diode to obtain the high voltage. According to the sine-wave rectifying system, the angle of current flow of the diode in the rectifier circuit becomes wider than that of the pulse rectifying system and the regulation of the high voltage is slightly improved. However, even in the sine-wave rectifying system, there is the fear that when the high voltage load current is changed, the resonant frequency of the resonant circuit will also be changed, and hence the high voltage will be varied.

The present device comprises a high voltage generating circuit as shown in FIG. 1, in which the high voltage will not be varied even when the load is varied.

2. Field of the Invention:

The field of art to which this invention pertains is high voltage generating circuits for the anode of color television receivers and in particular to circuits designed to improve voltage regulation.

SUMMARY OF THE INVENTION

It is an important feature of the present invention to provide an improved high voltage regulation circuit for a color television receiver.

It is a principal object of the present invention to provide a high voltage regulating circuit for a television receiver which prevents the development or undesirable voltages due to a shift in the horizontal oscillator frequency or at the same time maintain good voltage regulation under high anode current loads.

It is a specific object of the present invention to provide a high voltage regulating circuit which utilizes a flyback transformer having an input resonant frequency in the vicinity of but substantially higher than a horizontal oscillator frequency and wherein the primary winding of the flyback transformer has a series resonant circuit with a resonant frequency in the vicinity of but lower than the frequency of the horizontal oscillator.

It is a further object of the present invention to provide a high voltage regulating circuit as described above wherein the resonant frequency of the flyback transformer is in the vicinity of 20 KHz and wherein the resonant frequency of the series resonant circuit associated with the primary winding of the flyback transformer is in the vicinity of 10 KHz.

These and other objects, features and advantages of the present invention will be understood in greater detail from the following description and associated drawings wherein reference numerals are utilized to designate a preferred embodiment.

DESCRIPTION OF THE PREFERRED EMBODIMENT

The present device relates to a high voltage generating circuit for use in a television receiver and the like, and particularly a device for improving high voltage regulation and preventing the generation of abnormal high voltages caused by a shift of the oscillating frequency of a horizontal oscillator.

Figure 1:
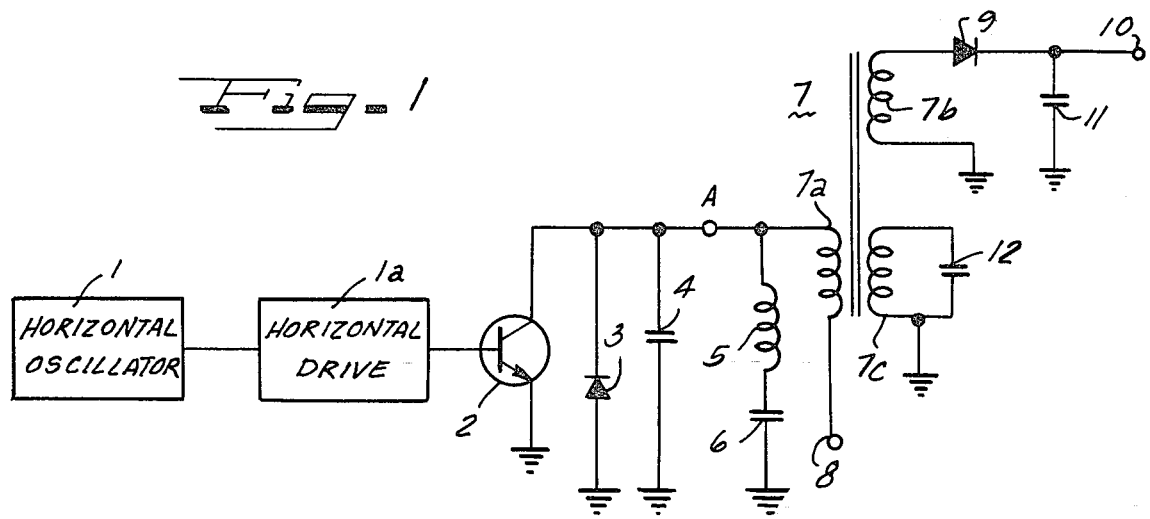
FIG. 1 is a schematic of voltage regulating circuit which produces good voltage regulation upon high anode current load but which can produce undesirable high voltages upon a shift occurring in the horizontal oscillator frequency.

In FIG. 1, reference numeral 1 designates a horizontal oscillator having a frequency of, for example 15.75 KHz. The output side of this horizontal oscillating circuit 1 is connected through a driving circuit 1a to the base electrode of an npn-type transistor 2 forming a switching element, and the emitter electrode of the transistor 2 is grounded. The collector electrode of the transistor 2 is grounded through a damper diode 3 and also grounded through a resonant capacitor 4. Further, the collector electrode of the transistor 2 is grounded through a series circuit consisting of a horizontal deflection coil 5 and a DC block capacitor 6 and also connected through a primary winding 7a of a flyback transformer 7 to a power supply terminal 8 to which a positive DC voltage is supplied. In this case, the primary side of the flyback transformer 7 is selected to have a resonant frequency relatively higher than the horizontal frequency of 15.75 KHz, that is, for example, about 50 KHz so that a pulse having a width corresponding to the horizontal blanking period in a video signal may be generated and also a saw-tooth current of normal horizontal period may flow through the horizontal deflection coil 5. The resonant frequency of the primary side of the flyback transformer 7 is mainly determined by the inductances of the horizontal deflection coil 5 and the primary winding 7a, respectively, and the capacitance of capacitor 4. Since the impedance of the DC block capacitor 6 relative to the horizontal frequency is nearly zero, the effect of the capacitor 6 can be neglected. One end of a secondary winding 7b of the flyback transformer 7 is grounded while the other end thereof is connected through a diode 9 forming a high voltage rectifier circuit to a high voltage terminal 10 for supplying a high voltage to the anode of a cathode ray tube. The connection point between the diode 9 and the high voltage terminal 10 is grounded through a capacitor 11. The capacitor 11 is formed by the conductive films which are respectively deposited on the inner and outer walls of the cathode ray tube in accordance with the prior art. In addition, the flyback transformer 7 is provided with a tertiary winding 7c across which a capacitor 12 is connected to form a resonant circuit. In this case, the resonant frequency of this resonant circuit is selected to be in the vicinity of the horizontal frequency $f_H$, for example, 15.75 KHz, and the waveform of the voltage obtained across the secondary winding 7b of the flyback transformer 7 is substantially sinusoidal.

Figure 2:
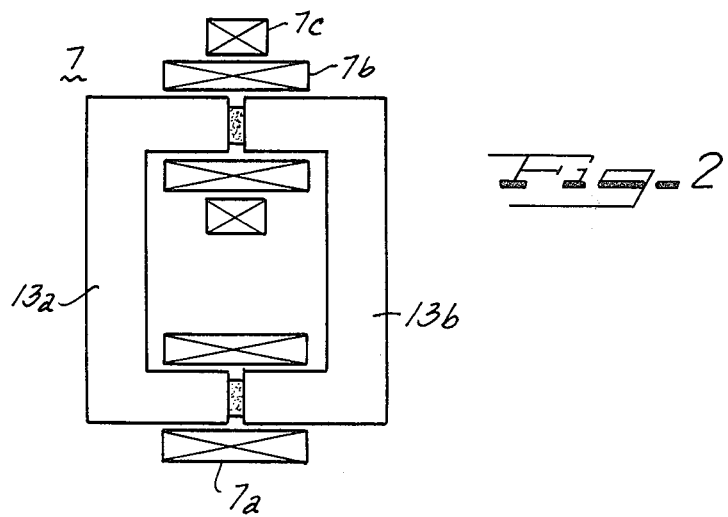
FIG. 2 shows a graphic illustration of the windings of a flyback transformer according to the present invention and in particular shows the arrangement for producing loose coupling between the primary and secondary winding and tight coupling between the secondary and tertiary windings.

In this case, the flyback transformer 7 is constructed in such a manner that as shown in FIG. 2, two U-shaped cores 13a and 13b are combined to form a square configuration, the primary winding 7a and the secondary winding 7b are respectively wound about the end portions of the U-shaped cores 13a and 13b, which are respectively opposed to each other, with the electromagnetic coupling between the primary and secondary windings 7a and 7b being made relatively loose (0.5 < K < 0.9, where K is coupling coefficient), and the tertiary winding 7c is wound about the same axis as that of the secondary winding 7b with the electromagnetic coupling between the secondary and tertiary windings 7b and 7c being made relatively close (K > 0.9).

Figure 3:
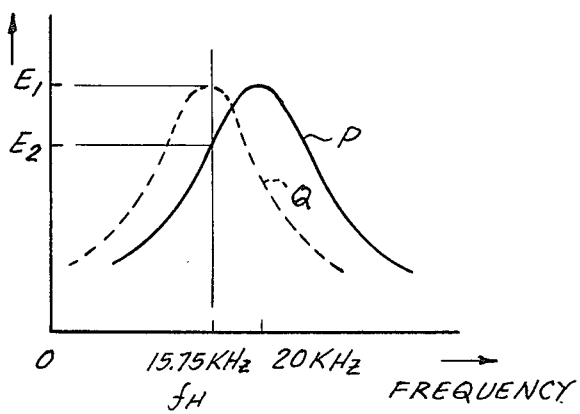
FIG. 3 is a frequency-voltage graph illustrating the operation of the circuit of FIG. 1.

In FIG. 1, the inductance values of the primary, secondary and tertiary windings 7a, 7b and 7c of the flyback transformer 7, the inductance value of the horizontal deflection coil 5, the capacitance value of the capacitor 12, and the values of the electromagnetic coupling coefficients K of the primary, secondary and tertiary windings 7a, 7b and 7c of the flyback transformer 7 are respectively selected so that the resonant frequency of the system looking into the flyback transformer 7 from a point A may be a little higher than the horizontal frequency $f_H$ or 15.75 KHz, that is, for example, 20 KHz as shown in FIG. 3 by a solid line P.

Figure 4:
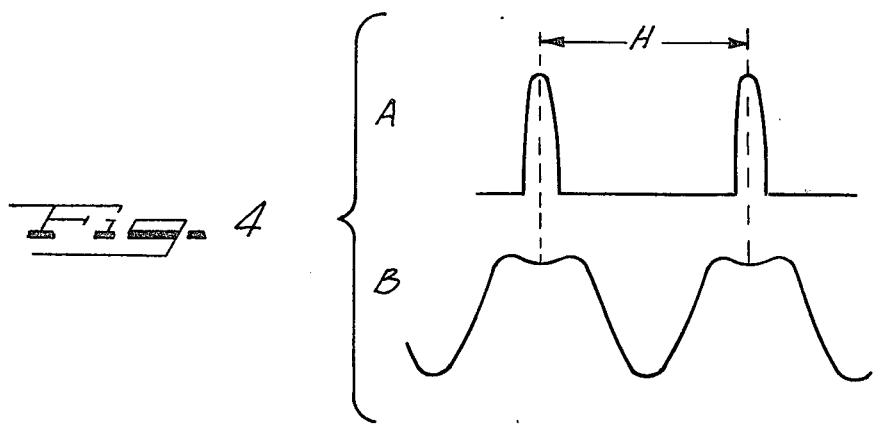
FIG. 4 shows two waveforms associated with the operation of the circuit of FIG. 1.

Since the high voltage generating circuit of FIG. 1 is constructed as described above, a pulse signal or horizontal period H as shown in FIG. 4A is obtained at the primary side of the flyback transformer 7. Further, since the resonant frequency looking into the flyback transformer 7 from the point A is selected to be in the vicinity of the horizontal frequency $f_H$ or 15.75 KHz, that is, for example, 20 KHz, the flyback transformer 7 produces across the secondary winding 7b thereof a signal whose waveform is substantially sinusoidal but its peak portion is flattened as shown in FIG. 4B. Accordingly, the angle of current flow of the rectifier 9 is widened, and the regulation of the high voltage derived from the output terminal 10 is improved.

In this case, when a high voltage load current does not flow, the capacitor 11 is electrically charged up to the peak value of the waveform shown in FIG. 4B, and the diode 9 becomes nonconductive. At this time, the capacitor 11 is in such a condition as being electrically disconnected from the flyback transformer 7, and hence the capacitance value of the capacitor 11 may not affect the resonant frequency of the flyback transformer 7. When a high voltage load current flows therethrough, the electric charge stored in the capacitor 11 flows to the cathode ray tube, so that the voltage across the capacitor 11 is decreased. In order to compensate for the above voltage drop, a voltage produced at the secondary winding 7b of the flyback transformer 7 is fed through the diode 9 to the capacitor 11. Thus, when the diode 9 becomes conductive, the capacitor 11 will be connected to the secondary winding 7b of the flyback transformer 7, and the resonant frequency of the flyback transformer system, that is, the central frequency of the resonant frequency characteristic is moved toward the horizontal frequency $f_H$, for example, 15.75 KHz, as shown in FIG. 3 by a dotted line $\theta$, with the result that the output, that is, the voltage produced across the secondary winding 7b will be increased. As a result, it is possible to reduce the lowering of the high voltage caused by increasing the high voltage load current.

As mentioned above, according to the embodiment of FIG. 1, since the resonant frequency of the flyback transformer system looking from the side of the primary winding 7a of the flyback transformer 7 is selected higher than the horizontal frequency, the capacitor 11 of the like comes to be connected to the resonant circuit of the flyback transformer system when the high voltage load current flows therethrough and the resonant frequency is lowered to increase the voltage produced at the secondary winding 7b of the flyback transformer 7. Further, the resonant circuit consisting of the tertiary winding 7c and the capacitor 12 affects the voltage produced at the secondary winding 7b of the flyback transformer 7 to change its waveform to be substantially sinusoidal with its peak portion being flattened as shown in FIG. 4B. As a result, the angle of current flow of the diode 9 forming the high voltage rectifier circuit is widened and the lowering of the high voltage caused by the increase of the high voltage load current can be reduced. Thus, the regulation of the high voltage can be improved.

However, in the high voltage generating circuit as shown in FIG. 1, if the oscillating frequency of the horizontal oscillating circuit 1 is shifted from the normal horizontal frequency 15.75 KHz to, for example, about 20 KHz upon turning on the power supply switch in a television receiver, switching the channel and the like, the high voltage obtained at the high voltage terminal 10 rises above the desired value. This undesirable rise in high voltage is applied to the anode of the cathode ray tube and can produce damage to the cathode ray tube, X-ray radiation and the like.

In view of the above described drawbacks, the present device is to improve the regulation of high voltage similarly as the embodiment of FIG. 1 and also to prevent the generation of undesirable high voltages caused by the shift of the oscillating frequency of the horizontal oscillating circuit.

Figure 5:
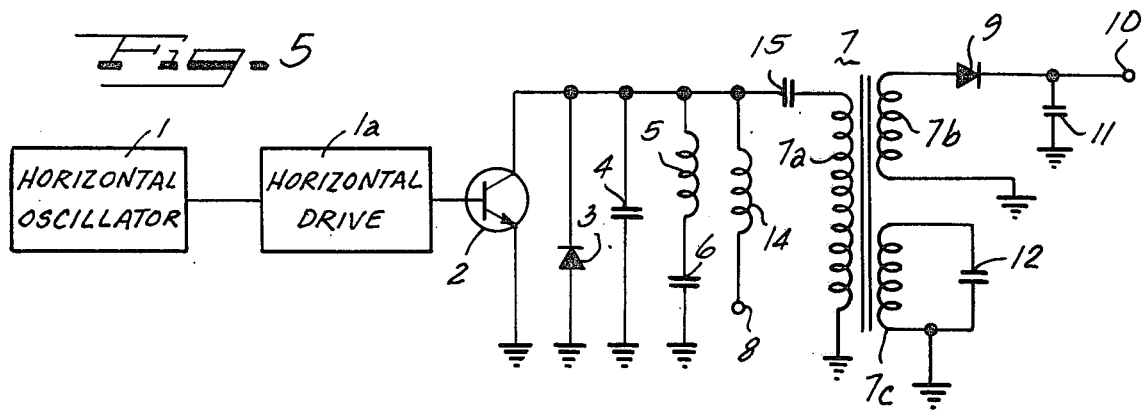
FIG. 5 is a schematic of a high voltage regulating circuit according to the present invention which utilizes a series resonant circuit to prevent undesirable rises in high voltage upon a shift in the horizontal oscillator frequency.

One embodiment of the high voltage generating circuit of the device will hereinbelow be described with reference to FIG. 5. In FIG. 5, elements corresponding to those in FIG. 1 bear the same reference numerals and detailed description is omitted.

The embodiment of FIG. 5 is different from the embodiment of FIG. 1 in that a capacitor 15 is connected to the primary winding 7a of the flyback transformer 7, and the transistor 2 is fed with a power supply from the power supply terminal 8 through a choke coil 14, but the other portions thereof are formed similarly to those in FIG. 1. Therefore, the resonant frequency characteristics looking into the flyback transformer 7 from the point A will have a first resonant point in the vicinity of 20 KHz as shown by a curve R in FIG. 6, which is similar to the curve P in FIG. 3.

Figure 6:
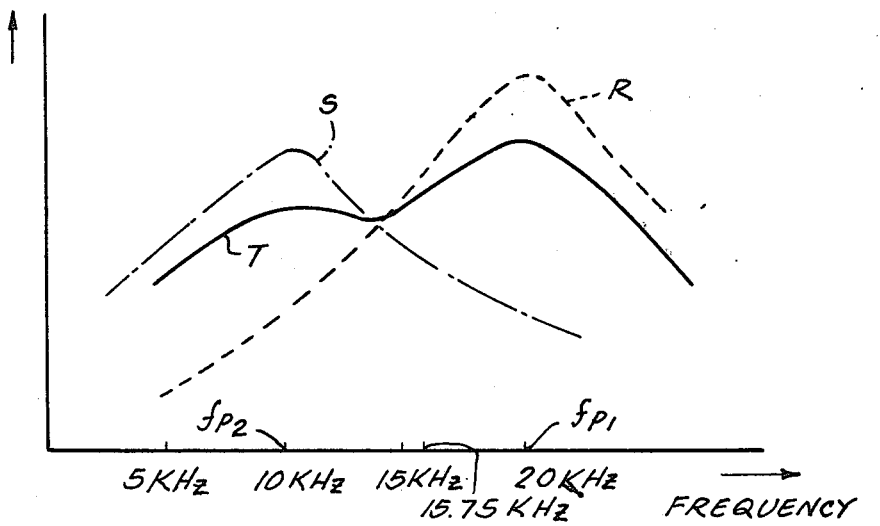
FIG. 6 is a voltage-frequency graph showing the locations of the resonant frequencies developed in the circuit of FIG. 5 and also showing a composite frequency-voltage graph of that circuit.

In the embodiment of FIG. 5, the resonant frequency of a series resonant circuit formed by the capacitor 15 and the primary winding 7a of the flyback transformer 7 is selected lower than the horizontal frequency, for example, 9 to 10 KHz. Accordingly, the resonant frequency characteristics of this series resonant circuit is shown in FIG. 6 by a curve S in which a second resonant point is set in the vicinity of 9 to 10 KHz. As a result, the frequency characteristic of the high voltage generating circuit is shown by a curve T in FIG. 6 resulting from the composition of the curves R and S. In this case, a frequency $f_{p1}$ at the first resonant point is preferably higher than the horizontal frequency $f_H$ and lower than twice the horizontal frequency, that is, $2f_H$. A frequency $f_{p2}$ at the second resonant point is preferably lower than the horizontal frequency $f_H$ and higher than $\frac{1}{2}$ the horizontal frequency, that is, $\frac{1}{2}f_H$. A good example of the high voltage generating circuit according to this device was obtained with the components having the following values: the inductance value of the primary winding 7a of the flyback transformer 7 is 5.4 mH, the inductance value of the tertiary winding 7c thereof is 1.67 mH, the electromagnetic coupling coefficient K between the primary and tertiary windings 7a and 7c is 0.62, the inductance value of the horizontal output transformer 14 is 7.3 mH, the inductance value of the horizontal deflection coil 5 is 950 $\mu$H, the capacitance value of the capacitor 4 is 16.0 nF, the capacitance value of the capacitor 12 is 56.0 nF, and the capacitance value of the capacitor 15 is 41.0 nF.

Since the high voltage generating circuit of this device is constructed as mentioned above, the flyback transformer 7 produces across its secondary winding 7b a signal whose waveform is substantially sinusoidal with its peak portion being flattened as shown in FIG. 4B similar to that of the embodiment of FIG. 1, and the angle of current flow of the rectifier circuit composed of the diode 9 becomes widened with the result that the regulation of the high voltage obtained at the high voltage terminal 10 is improved. In this case, as in the embodiment of FIG. 1, when the high voltage load current does not flow, the capacitor 11 is electrically charged up to the peak value of the waveform shown in FIG. 4B. Accordingly, when the capacitor 11 is charged to the voltage of peak value, no current flows through the diode 9 to make it nonconductive. In this case, the capacitor 11 is electrically disconnected from the flyback transformer 7, and hence the capacitance value of the capacitor 11 will not affect the resonant frequency at the side of the flyback transformer 7. Further, when the high voltage load current flows, the electric charge stored in the capacitor 11 flows to the cathode ray tube, so that the voltage across the capacitor 11 is lowered. In order to compensate for this voltage drop, the voltage produced at the secondary winding 7b of the flyback transformer 7 is supplied through the diode 9 to the capacitor 11, so that current flows through the diode 9 to make it conductive.

When the diode 9 becomes conductive, the capacitor 11 is connected to the secondary winding 7b of the flyback transformer 7 and the first resonant frequency $f_{p1}$ of the flyback transformer system is moved to the lower side. That is to say, the first resonant frequency $f_{p1}$ is shifted toward the horizontal frequency $f_H$, for example, 15.75 KHz, and the output, that is, the voltage obtained across the secondary winding 7b will be increased. As a result, the lowering of the high voltage caused by increases in high voltage load current can be compensated.

Further, according to this device, with the provision of the series resonant circuit consisting of the capacitor 15 and the primary winding 7a of the flyback transformer 7, the difference between the peak voltage value at the first resonant point, and the voltage value at the horizontal frequency $f_H$ becomes small as compared with that of the embodiment of FIG. 1, so that even when the oscillating frequency of the horizontal oscillating circuit is shifted to a higher side upon turning on the power supply switch, switching channels and the like, the high voltage obtained at the high voltage terminal 10 will not become undesirably high.

As described above, according to this device, regulation of the high voltage can be improved similarly to the embodiment of FIG. 1 and also an undesirable high voltage will not be caused by an upward shift of the oscillating frequency of the horizontal oscillating circuit 1.

It will be apparent to those skilled in the art that many modifications and variations may be effected without departing from the spirit and scope of the novel concepts of the present invention.

I claim as my invention:

1. A high voltage generating circuit comprising:
   a horizontal oscillator developing an output signal at the horizontal sweep frequency;
   a flyback transformer;
   means for coupling the horizontal oscillator output to the primary of said flyback transformer;
   the primary and secondary windings of said flyback transformer being coupled loosely to provide substantial isolation therebetween;
   circuit means causing the input resonant frequency of said flyback transformer to be in the vicinity of and higher than the frequency of said horizontal oscillator; and
   said flyback transformer having a separate resonant circuit associated with its primary winding and having a resonant frequency in the vicinity of and lower than that of said horizontal oscillator.

2. A high voltage generating circuit in accordance with claim 1, wherein the resonant frequency of the input of said flyback transformer is in the range between 10 and 100% higher than the horizontal oscillator frequency, and wherein the resonant frequency of said separate resonant circuit is in the range between 10 and 100% lower than the horizontal oscillator frequency.

3. A high voltage generating circuit in accordance with claim 1, wherein the horizontal sweep frequency is 15.75 KHz, the flyback transformer input resonant frequency is in the vicinity of 20 KHz, and the resonant frequency is in the vicinity of 10 KHz.

4. A high voltage generating circuit comprising:
   a horizontal oscillator developing an output signal at the horizontal sweep frequency;
   a switching device;
   a flyback transformer;
   means for coupling the horizontal oscillator output through the switching device to the primary of said flyback transformer;
   the primary and secondary windings of said flyback transformer being coupled loosely to provide substantial isolation therebetween;

means for rectifying the output of said secondary winding and for coupling the rectified signal to the high voltage anode of a television receiver;

a first capacitor coupled in an equivalent parallel relation to said secondary winding and forming an equivalent parallel resonant circuit therewith;

said equivalent parallel resonant circuit having a resonant frequency which is higher than the horizontal sweep frequency;

a second capacitor coupled in a circuit between said switching element and the primary winding of said flyback transformer and forming a series resonant circuit with said primary winding, said series resonant circuit having a resonant frequency which is lower than the horizontal sweep frequency.

5. A high voltage generating circuit in accordance with claim 4, wherein the horizontal sweep frequency is 15.75 KHz, the resonant frequency of said equivalent parallel resonant circuit is in the vicinity of 20 KHz, and the resonant frequency of said series resonant circuit is in the vicinity of 10 KHz.

* * * * *